United States Patent [19]

Marschall

[11] Patent Number: 4,870,624
[45] Date of Patent: Sep. 26, 1989

[54] PROCEDURE FOR SEISMIC SURVEYING

[75] Inventor: Roland Marschall, Hanover, Fed. Rep. of Germany

[73] Assignee: Prakla-Seismos AG, Hanover, Fed. Rep. of Germany

[21] Appl. No.: 282,157

[22] Filed: Dec. 9, 1988

[30] Foreign Application Priority Data

Dec. 9, 1987 [DE] Fed. Rep. of Germany ....... 3742147
Dec. 12, 1987 [DE] Fed. Rep. of Germany ....... 3742528

[51] Int. Cl.$^4$ ............................................. G01V 1/38
[52] U.S. Cl. ....................................... 367/15; 181/110
[58] Field of Search ......................... 367/15, 20, 72, 56, 367/37, 58; 181/108, 110

[56] References Cited

U.S. PATENT DOCUMENTS 3,786,408  1/1974  Jenkinson et al. .................... 367/15

OTHER PUBLICATIONS

F. Kirchheimer, Transformation of Seismic 3D Data by Separated Sinc Interpolation, 1986.
Prakla-Seismos GmbH, Shallow Water Geophysical Surveys, pp. 2-23, 48th EAEG Meeting, 1986, Oostende.
GECO brochure (Geophysical Company of Norway A.S.), undated.

*Primary Examiner*—Thomas H. Tarcza
*Assistant Examiner*—Ian J. Lobo
*Attorney, Agent, or Firm*—Walter C. Farley

[57] ABSTRACT

A procedure for seismically surveying a region, in particular a marine region, wherein objects such as drilling platforms (1,2,3) prevent surveying by conventional seismic means such as towed streamers. In the invention, the total region first divided into sub-regions (5,6,7) wherein receiver chains (4) are stationarily mounted between two of the objects. A sound transmitter is the moved relative to the chain of receivers along a grid as the transmitter is repeatedly, periodically activated. Data collected by the receivers are recorded for each sub-region and the completely surveyed sub-regions are combined by grid transformation to construct a uniform three-dimensional data volume.

11 Claims, 4 Drawing Sheets

PROCEDURE FOR SEISMIC SURVEYING

The invention concerns a procedure for seismic surveying and particularly to a method for surveying a region which is not accessible by ordinary surveying or exploration apparatus.

BACKGROUND OF THE INVENTION

Three-dimensional measurements have been done for several years in marine seismology and offer the advantage of high information density and therefore increased information, of the availability of genuine vertical seismograms and of the possibility of making horizontal sections. Recording a three-dimensional volume of data in marine seismology is essentially accomplished using streamers towed behind ships. Frequently such streamers are towed parallel to each other.

To survey a predetermined region, the towing ship, which simultaneously tows the transmitter or sound sources, is made to move preferably in parallel passes over the total area. Thereupon a data-volume can be constructed from the surveyed tracks and, after the dynamic and static corrections and stacking have been performed, further regional profiles may be ascertained in any direction and be evaluated.

Recording a three-dimensional data-volume requires that the basic data be obtained in a tight grid. In turn, this requires that both the ship and the streamers be positioned accurately, i.e. that there position be known precisely. As a rule the tracks are surveyed while moving over a path of several kilometers, the spacing from the previous path being relatively small. In the presence of ocean currents, the streamer drift may be substantial. Even though this drift can be corrected for and eliminated when the final data-volume is constructed, it may nevertheless lead to problems when a surveying trip takes place in areas in which stationary objects such as oil platforms, buoys, shallows or other obstructions exist. Such objects on occasion may entirely prevent surveying the region by means of towed streamers. Especially where drilling platforms or other drilling structures are present, safety distances must be kept, so that measurements by streamers towed by ships are nearly impossible.

SUMMARY OF THE INVENTION

Accordingly, it is an object of the present invention to provide a for seismically surveying a region not all of which is directly accessible to three-dimensional seismological surveying by conventional techniques.

Briefly described, the invention includes a method for surveying the seismic data of a region comprising the steps of establishing a substantially stationery row of seismic receivers at a predetermined location relative to the region, providing a seismic transmitter which can be moved relative to the row of receivers and selectively actuated to transmit sonic energy into the region, moving and periodically actuating the transmitter through a first measurement grid pattern and surveying the seismic data in a first sub-region based on sonic energy received during the first pattern, moving and periodically actuating the transmitter through a second measurement grid pattern and surveying the seismic data in a second sub-region based on sonic energy received during the second pattern while maintaining the row of receivers stationary at the predetermined location, subjecting the data for at least one of the sub-regions surveyed during one of the patterns to coordinate transformation to bring the measurement grids for the patterns together, and combining the data surveyed during the first and second patterns to form a uniform data volume for the whole region.

The procedure of the invention makes it possible to survey a three-dimensional data-volume also in those regions where conventional detection using streamers towed by ships is impossible.

In the invention, the entire region to be surveyed first is divided into several sub-regions of which the orientation and the size shall be selected in relation to already present and stationary objects. Preferably, the sub-regions are formed as rectangles of which the bisecting lines are formed by the streamer (row or chain of receivers) extending between two stationary objects.

In lieu of the conventional streamer seismology wherein both the sound transmitter and the sound receiver are moved along a common path, the procedure of the invention calls merely for moving the sound source, while the receivers are stationary between the objects. Accordingly, the locations of the receivers can be determined in a far simpler manner than for a towed streamer. The position of a ship also can be determined comparatively accurately.

The invention offers the further advantage that the transmitter also can be moved transversely to the row of receivers in the conventional manner of three-dimensional land seismology.

Because the seismic receiver chain no longer needs to be towed by a ship, far smaller safety distances between ship and drilling platforms are now acceptable without danger to the platform. Another advantage is that the entire recording system is limited to approximately the ship's length, whereas in conventional tow-seismology such length is that of the ship plus the streamer chain.

After the seismic tracks have been fully surveyed in each sub-region, dynamic and static corrections and staking permit geometrically linking the surveyed data into a uniform data-volume of the whole region. The data from overlapping sub-regions may additionally be stacked to further improve their analysis.

The procedure of the invention results in a data-volume at least equivalent to one obtained in the absence of obstacles across a marine region.

BRIEF DESCRIPTION OF THE DRAWINGS

In order to impart full understanding of the manner in which these and other objects are attained in accordance with the invention, particularly advantageous embodiments thereof will be described with reference to the accompanying drawings, which form a part of this specification, and wherein.

DESCRIPTION OF A PREFERRED EMBODIMENT

Figure 1:
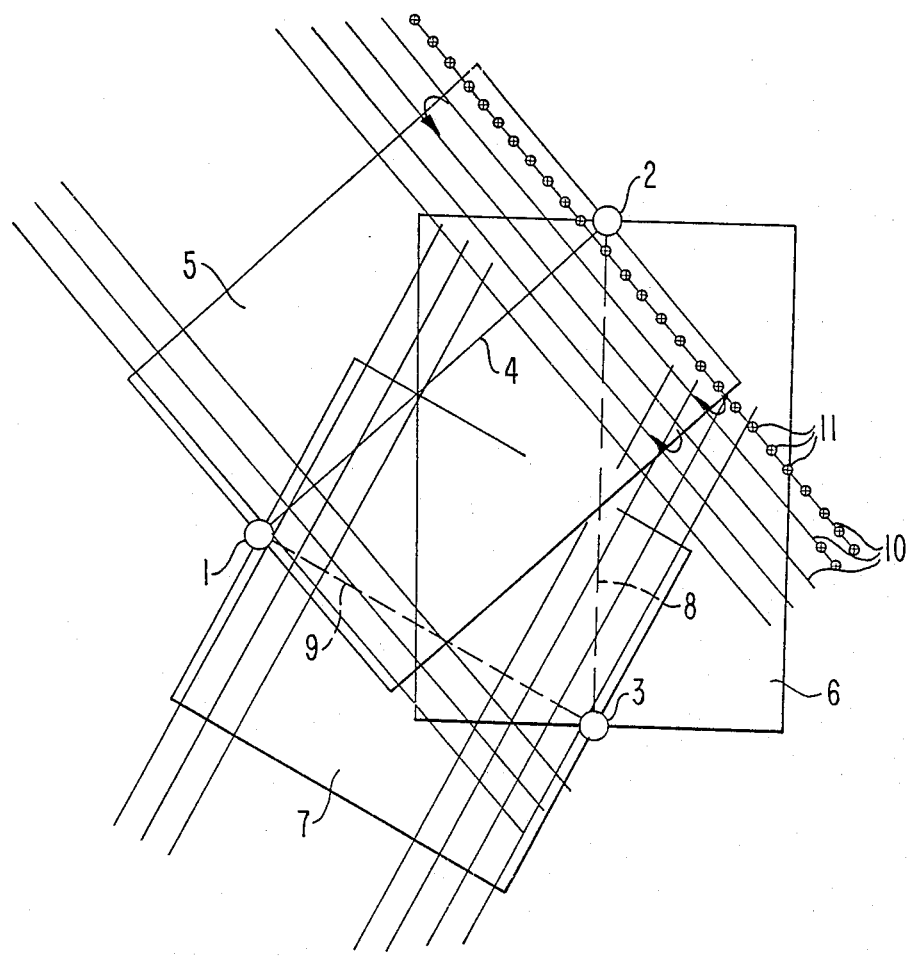
FIG. 1 is a plan view of a whole region to be surveyed with its sub-regions.

FIG. 1 shows three stationary objects 1, 2 and 3, which may be oil towers or platforms present in a specific marine region. If it is desired to seismically survey this marine region containing these oil platforms, then ordinarily it will be impossible to drag a streamer between the platforms, because of the safety distances which must be observed around such platforms.

In accordance with the invention, a row of seismic receivers is mounted in a stationary manner between each pair of stationary objects, for instance a streamer 4. This streamer is lowered to the desired depth using conventional means. As regards the platforms 1 and 2, the streamer 4 forms a line bisecting a rectangle 5 representing a sub-region of the whole region to be surveyed. At the same time that the first sub-region 5 is surveyed, other sub-regions 6 and 7 can be surveyed, with receiver chains 8 and 9 which are located between the pairs of stations 2 and 3 and 1 and 3, respectively. The sub-regions can be surveyed simultaneously or sequentially.

A streamer between two stations comprises a row of spaced seismic receivers. Because the receivers are stationary in a row between the stations, their positions are fixed. The sound source, preferably a hydraulic or pneumatic pulse generator, is towed by a ship preferably moving transversely to the row of receivers. The ship moves along parallel paths, such as along the lines 10, the lengths of which are about twice the width of the particular sub-regions 5, 6 or 7, whereby a below-surface region with an area equal about to a partial area 5, 6, or 7 can be completely surveyed seismologically.

The ship together with the sound source moves along a predetermined pattern over a grid in which the grid-points 11 indicate the particular shot positions where the transmitter is actuated.

After all the sub-regions of the whole region have been surveyed seismically, the recorded tracks are first subjected to the conventional static and dynamic corrections and to stacking. Thereby partial data-volumes of the whole grain are obtained.

In order to construct a three-dimensional data-volume of the whole region, the data-volumes of the sub-regions must be combined and are subjected to translation, expansion and/or rotation of the measurement-grid basic to data surveying. Preferably this is carried out using a computer program the principles of which can be found for instance in F. Kirchheimer, TRANSFORMATION OF SEISMIC 3D DATA BY SEPARATED SINC INTERPOLATION, 48th EAEG meeting, 1986, Oostende. Thereby a predetermined data-volume ascertained in a particular measurement grid can be geometrically transformed into another data volume of another measurement grid where said other data volume would have been produced when recording the data in the other measurement grid by essentially first expanding the original measurement grid and then rotating it in the area orientation, so that the original data-volume would have the desired orientation. This step allows combining all partial data-volumes of the sub-regions so that they all have the same orientation. Especially with respect to those regions within which takes place overlap of the sub-regions, additional data stacking may be carried out.

Figure 2A:
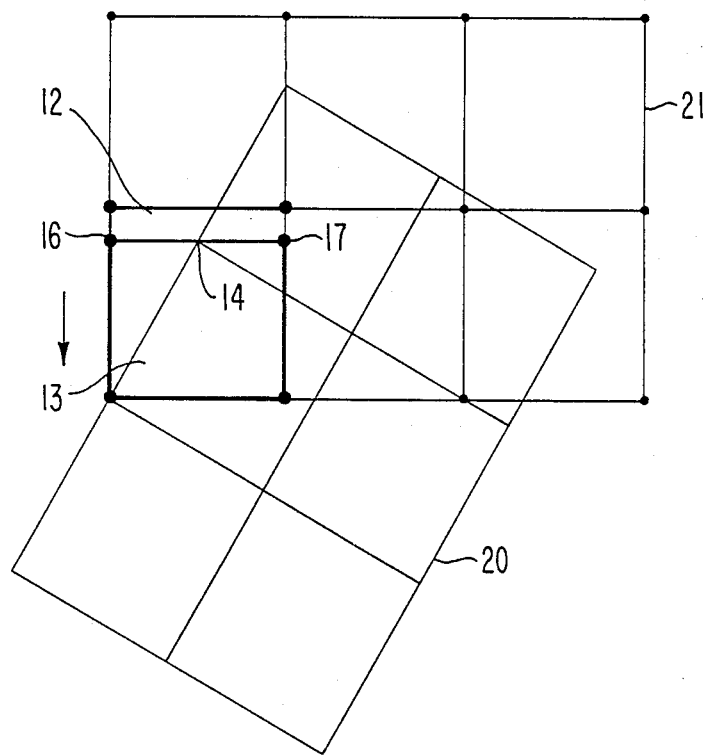
FIGS. 2a, 2b and 2c are schematic diagrams showing the steps of transforming a measurement grid.
Figure 2B:
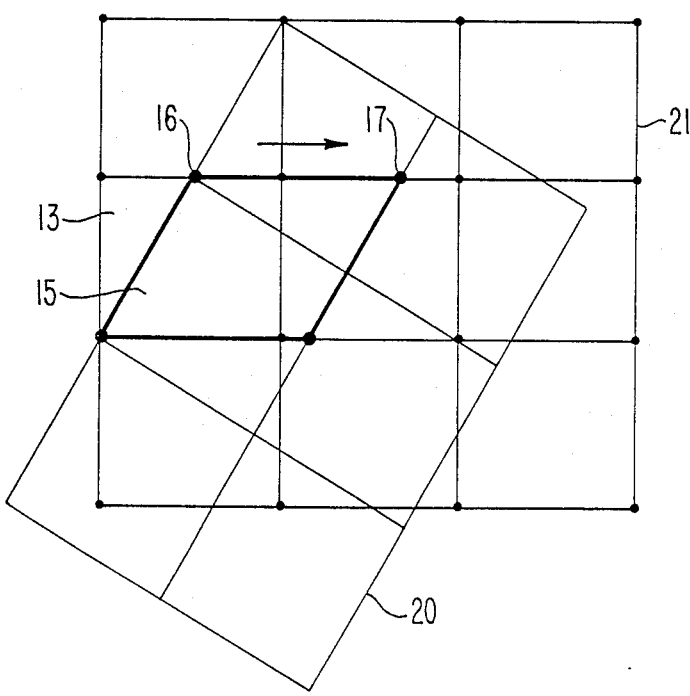
Figure 2C:
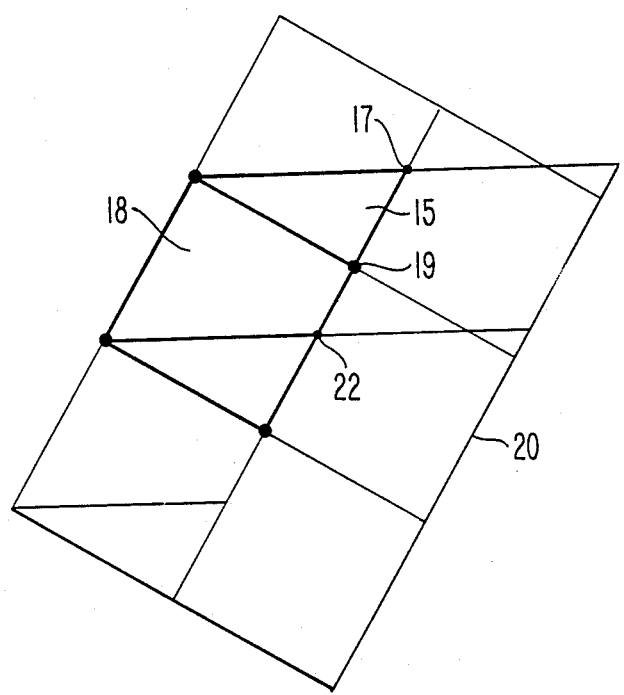

FIGS. 2 a–c show the essential steps of the transformation. Two grids are made, the original grid being denoted by 21 and the desired target grid by 20. First the corner points of a grid rectangle 12 of the original grid are compressed into a new rectangle 13 (FIG. 2a) until the upper edge of the original rectangle has been shifted with itself with its corner 16 moving parallel as far as the point 14. Thereupon, as shown in FIG. 2b, the points 16 and 17 of the rectangle 13 are laterally displaced simultaneously with a lateral rotation, resulting in a parallelogram 15. This parallelogram 15 is then made to coincide with the target grid 20 by shifting the points 17 and 22 as shown in FIG. 2c. Again a rectangle 18 is obtained, wherein the corner point 19 was produced by displacing the point 17.

Figure 3:
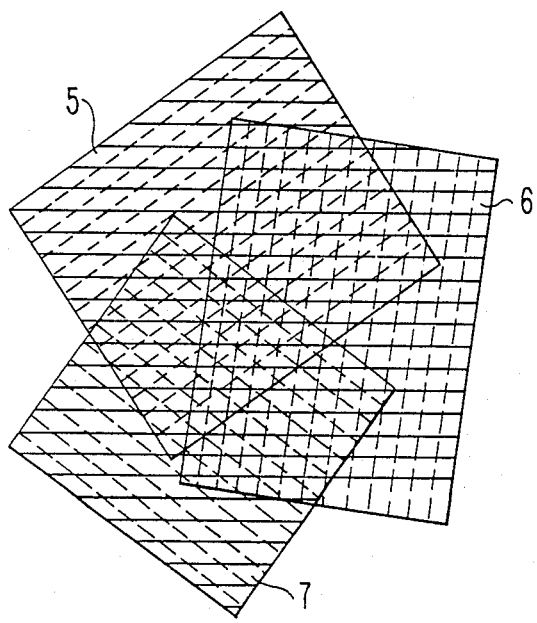
FIG. 3 is a schematic diagram showing a completed transformed measurement grid.

FIG. 3 shows the common horizontal orientation of the measurement grid of all sub-regions 5, 6 and 7 following the transformation.

In a system using two streamers mounted between three stationary stations, a measurement trip preferably takes place orthogonally to one of the streamers while the other streamer chain will be simultaneously traversed at an angle of 90°. This system also lends itself to geometrically transforming the collected data.

Once a data-volume of the entire region has been constructed in the above manner, conventional 3-D migration may be carried out to obtain a full three-dimensional set of data which otherwise would have been unavailable.

Figure 4:
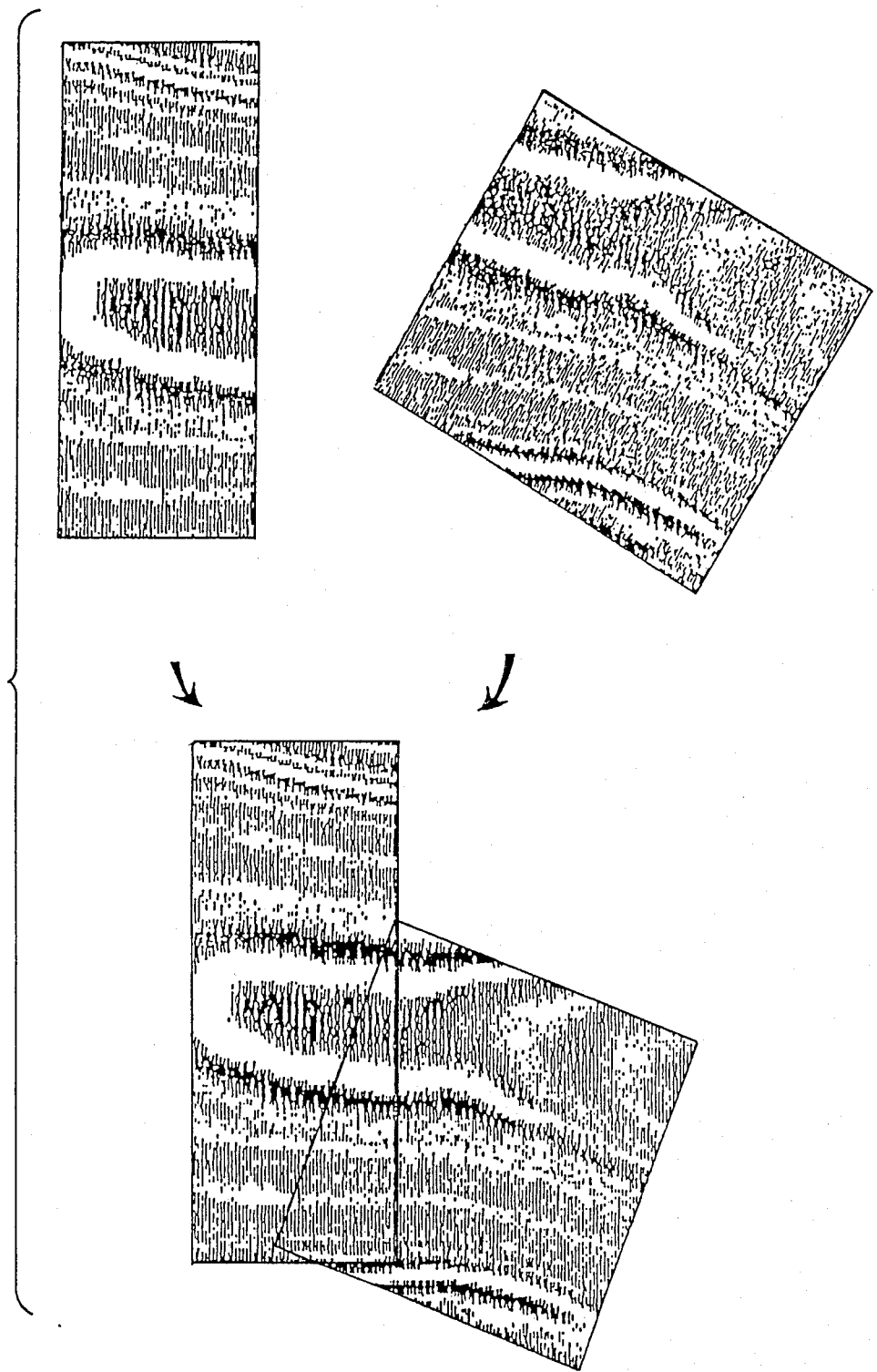
FIG. 4 is a graphical illustration of a data-volume prepared according to the invention.

FIG. 4 shows horizontal sections of various sub-regions combined by shifting, compressing and rotating into a uniform three-dimensional data-volume.

While certain advantageous embodiments have been chosen to illustrate the invention, it will be understood by those skilled in the art that various changes and modifications can be made therein without departing from the scope of the invention as defined in the appended claims.

What is claimed is:

1. A method for surveying and collecting marine seismic data of a region comprising the steps of
    establishing a substantially stationery row of marine seismic receivers at a predetermined location relative to the region,
    providing a marine seismic transmitter which can be moved relative to the row of receivers and selectively actuated to transmit sonic energy into the region,
    moving and periodically actuating the transmitter through a first measurement grid pattern and recording the seismic data in a first sub-region based on sonic energy received during the first pattern,
    moving and periodically actuating the transmitter through a second measurement grid pattern and recording the seismic data in a second sub-region based on sonic energy received during the second pattern while maintaining the row of receivers stationary at the predetermined location,
    subjecting the data for at least one of the sub-regions recorded during one of the patterns to coordinate transformation to bring the measurement grids for the patterns together, and
    combining the data recorded during the first and second patterns to form a uniform data volume for the whole region.

2. A method according to claim 1 and including positioning a plurality of rows of receivers in different sub-regions and extending in different directions, and subjecting the data for each sub-region to at least one of translation, dilation and rotation of the basic measurement grid for the sub-region before the data are combined.

3. A method according to claim 2 wherein
    each of the rows of receivers is a chain of marine receivers located in a body of water having a plurality of stationary objects therein,
    the transmitter is aboard a ship, and each row of receivers extends between two of the stationary objects.

4. A method according to claim 3 wherein the stationary objects are drilling platforms.

5. A method according to claim 3 which includes, in each of the patterns, moving the ship essentially perpendicularly to a row of receivers along spaced, parallel paths.

6. A method according to claim 3 which includes, in each of the patterns, moving the ship essentially parallel to a row of receivers along spaced, parallel paths.

7. A method according to claim 2 including subjecting the data collected for overlapping sub-regions to data stacking before combination.

8. A method according to claim 3 wherein each grid pattern is in the overall form of one of a rectangle, trapezoid or parallelogram.

9. A method according to claim 8 including forming at least one grid pattern as a rectangle, positioning the row of receivers along a line bisecting the rectangle, and moving the ship along parallel paths about twice as long as the length of one side of the rectangle on one side of the row of receivers.

10. A method according to claim 2 which includes seismically surveying the sub-stratum as the uniform three-dimensional data volume of the whole region.

11. A method according to claim 2 and including attaching one end of each of a plurality of rows of receivers to one stationary object and moving the transmitter along one path over several sub-regions.

* * * * *